United States Patent
Zhong

(10) Patent No.: US 6,285,876 B1
(45) Date of Patent: Sep. 4, 2001

(54) TEST UNIT WITH PROGRAMMABLE TRANSMIT TIMING FOR TELECOMMUNICATION SYSTEMS

(75) Inventor: Lizhi Zhong, Parsippany, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/056,141

(22) Filed: Apr. 7, 1998

(51) Int. Cl.$^7$ .............. H04Q 7/20; H04B 17/00; H04B 3/46; G01R 31/08; H04J 3/06

(52) U.S. Cl. .............. 455/424; 455/67.4; 455/67.6; 370/250; 370/252; 370/508; 370/519; 375/224

(58) Field of Search .............. 455/67.6, 67.4, 455/67.1, 428, 424, 515, 434, 502, 503, 126, 561, 562; 370/249, 250–252, 350, 508, 519; 375/224, 225, 226; 379/1, 29, 9, 10, 12, 23

(56) References Cited

U.S. PATENT DOCUMENTS

| | | | |
|---|---|---|---|
| 4,516,269 | * | 5/1985 | Krinock .............. 455/67.6 X |
| 4,773,065 | * | 9/1988 | Kobayashi et al. .............. 370/362 |
| 5,095,500 | * | 3/1992 | Tayloe et al. .............. 379/32 |
| 5,280,629 | * | 1/1994 | LoGalbo et al. .............. 455/67.4 X |
| 5,425,076 | * | 6/1995 | Knippelmier .............. 379/27 |
| 5,604,728 | * | 2/1997 | Jylha .............. 455/67.4 X |
| 5,745,484 | * | 4/1998 | Scott .............. 370/347 |
| 5,784,406 | * | 7/1998 | DeJaco et al. .............. 370/250 X |
| 5,831,974 | * | 11/1998 | Suonvieri .............. 370/252 |
| 5,881,058 | * | 3/1999 | Chen .............. 370/335 |
| 5,898,682 | * | 4/1999 | Kanai .............. 370/331 |
| 5,907,813 | * | 5/1999 | Johnson, Jr. et al. .............. 455/502 |
| 5,930,707 | * | 7/1999 | Vambaris et al. .............. 455/424 |
| 5,943,617 | * | 8/1999 | Nakamura .............. 455/424 X |

OTHER PUBLICATIONS

"Mobile Station Base Station Compatibility Standard for Dual–Mode Wideband Spread Spectrum Cellular System", TIA/EIA/IS–95–A, 1995.

* cited by examiner

Primary Examiner—Tracy Legree
(74) Attorney, Agent, or Firm—Steve Mendelsohn

(57) ABSTRACT

The test unit delays its transmission of a reverse-link signal over the hard-wire connection to a base station by a specified transmission delay in order to ensure that the reverse-link signal is received at the base station within the base station search window. The present invention is especially useful in configurations in which the base station advances the timing of its forward-link signals to account for delay between the base station and its antennas and where there is a relatively large distance between the base station and its antennas. In such a configuration, without the transmission delay of the present invention, a reverse-link signal transmitted by a test unit over the hard-wire connection to the base station may arrive at the base station before the start of the base station search window, in which case, the test unit would not be able to initiate or maintain communications with the base station.

24 Claims, 1 Drawing Sheet

TEST UNIT WITH PROGRAMMABLE TRANSMIT TIMING FOR TELECOMMUNICATION SYSTEMS

BACKGROUND OF THE INVENTION

1. Field of the Invention

The present invention relates to communication systems, and, in particular, to mobile telephony systems that conform, for example, to an IS-95 standard.

2. Description of the Related Art

FIG. 1 shows a block diagram of part of a mobile telephony system conforming to an IS-95 standard. In the forward link, signals from base station 108 are transmitted by base station antenna 104 to mobile unit 102. Analogously, in the reverse link, signals from mobile unit 102 are received at base station antenna 104 for base station 108. Antenna 104 is typically hard-wired to base station 108 and signals are transmitted between base station 108 and antenna 104 over that hard-wire connection 106.

The timing of the transmission of forward-link signals within an IS-95 communication system is based on a global positioning system (GPS) time reference (called "GPS 0") derived at the base station, using a GPS receiver (not shown). As described in Section 6.1.5.1 of the IS-95-A Specification, each mobile unit derives its own time reference based on the earliest arriving multi-path component of the forward-link signals transmitted by the base station. Each mobile unit uses its derived time reference to control the timing of the transmission of reverse-link signals.

In an IS-95 communication system, there will be a delay between the time at which forward-link signals are time-stamped by a base station and the time at which the signals are actually transmitted by its antenna. This delay is due, at least in part, to the physical separation between the base station and its antenna, such as that shown in FIG. 1, which separation may vary from base station to base station in a communication system. Processing delay (e.g., from D/A conversion and modulation) also contributes to the duration between time-stamping and actual transmission.

According to Section 7.1.5.2 of the IS-95-A Specification, a base station advances the timing of the forward-link signals by an amount corresponding to the delay between time-stamping and actual transmission, so that the actual transmission of signals by the base station antenna will begin at GPS 0. The magnitude of this timing advancement is based on empirical measurements made when the base station and antenna are first configured. For base stations that have two or more different antennas, the timing advancement is based on the antenna having the smallest delay.

Each mobile unit will derive its own time reference based on the earliest arriving multi-path component of the forward-link signals and use the derived time reference to transmit the reverse-link signals back to the base station. The base station defines a search window within which it scans for reverse-link signals transmitted by the mobile unit. The position of the base station search window is defined with respect to the GPS 0 time reference derived by the base station.

It is desirable to configure each base station with a special test unit, such as test unit 112 of FIG. 1, which is designed for perform remote diagnostic and other maintenance tests on the operations of base station 108 from the central office of the communication system, without interrupting telecommunication service or having to send an operator to the base station. A test unit simulates the operations of a mobile unit to verify that the base station is operating properly.

A test unit may be hard-wired to the base station, as shown by connection 110 in FIG. 1. As such, communication signals between the base station and the test unit will not be transmitted or received by the base station antenna, and there will be minimal signal delay between the base station and the test unit. Like all forward-link signals, the forward-link signals transmitted from the base station to the test unit will be advanced in time to take into account the delay between the base station and its antennas. However, since there is minimal signal delay between the base station and the test unit, the time reference derived by the test unit from the forward-link signals will be earlier than the time reference derived by any of the mobile units by at least the magnitude of the timing advancement applied by the base station. In addition, the reverse-link delay between the test unit and the base station is smaller than the duration from the time that a signal is transmitted from any mobile unit until the time that the signal arrives at the base station.

If the forward-link delay between the base station and the base station antenna is larger than the total round-trip delay between the base station and the test unit (e.g., for configurations in which the antenna is located relatively far away from the base station), the reverse-link signals generated by the test unit may arrive at the base station outside of the base station search window (e.g., before the start of the search window). In that case, the test unit will not be able to establish communications with the base station and the test unit will not be able to perform its diagnostic and other maintenance functions.

For example, if the forward-link delay between the base station and the base station antenna is 100 $\mu$sec and the forward-link delay between the base station and the test unit is only 20 $\mu$sec, then, advancing the forward-link signals by the 100-$\mu$sec forward-link delay, will result in the test unit deriving a time reference equivalent to GPS time −80 $\mu$sec. If the reverse-link delay between the test unit and the base station is also 20 $\mu$sec, then the reverse-link signals transmitted by the test unit will arrive at the base station at GPS time −60 $\mu$sec. Since the base station search window typically starts at GPS time 0, the base station will not be able to process the reverse-link signals transmitted by the test unit.

There are a number of different types of communication systems in which these problems may occur. For example, in a wireless-over-cable communication system, in which communication signals such as PCS (Personal Communication System) signals are transmitted over a conventional cable television plant, signals from mobile units are first received by remote antennas, which send the signals over cables to the base station. In such wireless-over-cable configurations, the base station usually has multiple radiating antenna connectors for the same code division multiple access (CDMA) channel. In addition, the antenna connectors are usually far away from the base station.

Fiber microcell systems differ from wireless-over-cable systems in that fiber microcell systems use only one pair radiating antenna connectors for each sector, and the two antennas are very close together. However, the antennas are typically far away from the base station and fiber is used to connected the pair to the base station.

As such, test units may be unable to initiate and maintain communications with base stations in such wireless-over-cable and fiber microcell systems in which the antennas are far away from the base station.

SUMMARY OF THE INVENTION

The present invention is directed to test unit for the base station of a mobile telephony system, such as those that conform to an IS-95 standard, in which the test unit can be programmed to delay transmission of the reverse-link signals by a specified duration. By specifying the duration of the test unit delay to be greater than or equal to the total round-trip delay between the base station and its antenna, the test unit can ensure that the reverse-link signals will arrive at the base station within the base station search window. As such, a test unit in accordance with the present invention will be able to initiate and maintain communications with the base station, thereby simulating mobile unit operations and enabling the test unit to perform its diagnostic and other maintenance functions.

According to one embodiment, the present invention is directed to the transmission of a reverselink signal from a test unit over a hard-wire connection to a base station of a communication system, where the base station has a search window used to scan for the reverse-link signal. The test unit delays transmission of the reverse-link signal by a specified non-zero transmission delay in order for the reverse-link signal to arrive at the base station within the base station search window.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
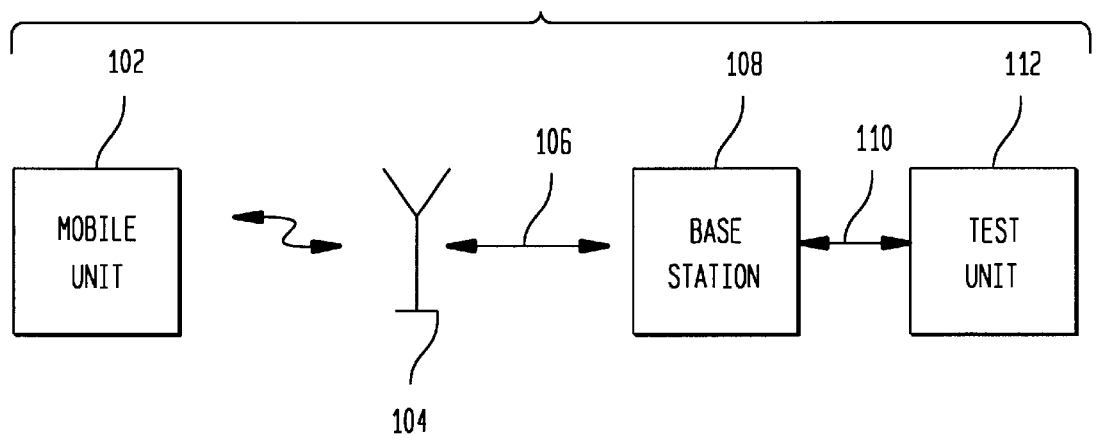
FIG. 1 shows a block diagram of part of a mobile telephony system conforming to an IS-95 standard.
Figure 2:
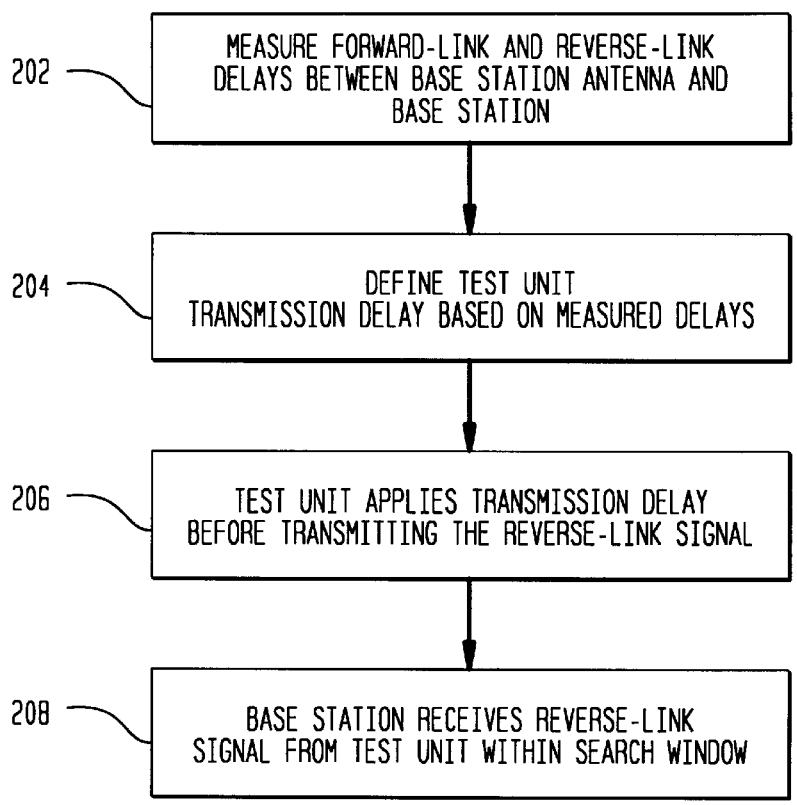
FIG. 2 shows a flow diagram of the processing implemented, according to one embodiment of the present invention.

FIG. 2 shows a flow diagram of the processing implemented, according to one embodiment of the present invention. According to this embodiment, a test unit that is hard-wired to a base station in a mobile telephony system, such as test unit 112 of FIG. 1, applies a specified delay before transmitting a reverse-link signal to the base station. The duration of the test unit transmission delay is selected to ensure that the reverse-link signal is received at the base station within the base station search window, so that communications between the base station and the test unit can be initiated and maintained to enable the test unit to perform its diagnostic and other maintenance functions.

In particular, when a base station, such as base station 108 of FIG. 1 is configured, the forward-link and reverse-link delays between the base station and its antenna, such as antenna 104 of FIG. 1, are measured (step 202 of FIG. 2). A test unit transmission delay is defined based on the measured forward-link and reverse-link delays (step 204). When the present invention is applied in an IS-95 communication system, the test unit transmission delay is preferably defined to be the sum of the forward-link and reverse-link delays plus an additional margin (e.g., at least 10 μsec, as derived from the requirements in Section 7.1.5.2 of the IS-95-A Specification).

In a preferred implementation, the forward-link delay for each sector and each carrier frequency is defined to be the minimum delay in the forward link between the base station and any of its antennas for that particular sector and that particular carrier frequency. Similarly, in a preferred implementation, the reverse-link delay for each sector and each carrier frequency is defined to be the minimum delay in the reverse link between the base station and any of its antennas for that particular sector and that particular carrier frequency. Different forward-link and reverse-link delays may be defined for each sector of a base station and for each signal carrier frequency supported by the base station. The delay values should remain unchanged as long as the configuration of the base station is not changed. The base station is preferably able to send the delay measurement results to the test unit in transmission messages.

The test unit applies the defined transmission delay before transmitting a reverse-link signal over the hard-wire connection to the base station (step 206). When the magnitude of the transmission delay is appropriately selected, the reverse-link signal from the test unit will be guaranteed to arrive at the base station within the base station search window (step 208). As such, communications between the test unit and the base station can be initiated and maintained, thereby enabling the test unit to perform its diagnostic and other maintenance functions.

When different transmission delays are used for different carrier frequencies, the test unit applies the corresponding transmission delay for each signal channel having a different carrier frequency. Since the test unit transmission delays are based on empirical measurements for each base station, the present invention enables the test unit to initiate and maintain communications with its associated base station no matter what configuration the base station has, including wireless-over-cable and fiber microcell configurations in which the base station antennas are relatively far from the base station.

Those skilled in the art will understand that, when the present invention is implemented in an IS-95 mobile telephony system, the test unit may be a code division multiple access (CDMA) radio test unit (CRTU) used by a service provider to perform routine tests without interrupting service. The present invention solves the problem of a CRTU being unable to initiate communications with its base station, because the reverse-link signal from the CRTU arrives at the base station before the start of the base station search window. This problem can occur when the base station antenna is located relatively far away from the base station (as in wireless-over-cable systems and fiber microcell systems).

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for transmitting a reverse-link signal from a test unit over a hard-wire connection to a base station of a communication system, the base station having a search window used to scan for the reverse-link signal, wherein the test unit delays transmission of the reverse-link signal by a specified non-zero transmission delay in order for the reverse-link signal to arrive at the base station within the base station search window.

2. The method of claim 1, wherein a different transmission delay is defined for each different carrier frequency supported by the test unit.

3. The method of claim 1, wherein the transmission delay is defined based on actual measurements of the forward-link and reverse-link delays between the base station and the test unit.

4. The method of claim 1, wherein the communication system conforms to an IS-95 standard.

5. The method of claim 4, wherein the communication system is a wireless-over-cable system or a fiber microcell system.

6. The method of claim 4, wherein the test unit is a CDMA radio test unit.

7. The method of claim 1, wherein:
a different transmission delay is defined for each different carrier frequency supported by the test unit;
each transmission delay is defined based on measurements of the forward-link and reverse-link delays;
if the transmission delay were set to zero and if the reverse-link signal arrives at the base station before the start of the base station search window, then communications between the test unit and the base station would not be possible;
the communication system conforms to an IS-95 standard; and
the test unit is a CDMA radio test unit.

8. The method of claim 7, wherein the communication system is a wireless-over-cable system or a fiber microcell system.

9. The method of claim 1, wherein, if the transmission delay were set to zero and if the reverse-link signal arrives at the base station before the start of the base station search window, then communications between the test unit and the base station would not be possible.

10. The method of claim 1, wherein:
the forward-link delay between the base station and a base station antenna is greater than the round-trip delay between the base station and the test unit; and
the magnitude of the specified non-zero transmission delay is based on a difference between the forward-link delay between the base station and the base station antenna and the round-trip delay between the base station and the test unit.

11. A test unit for transmitting a reverse-link signal over a hard-wire connection to a base station of a communication system, the base station having a search window used to scan for the reverse-link signal, wherein the test unit is configured to delay transmission of the reverse-link signal by a specified non-zero transmission delay in order for the reverse-link signal to arrive at the base station within the base station search window.

12. The test unit of claim 11, wherein a different transmission delay is defined for each different carrier frequency supported by the test unit.

13. The test unit of claim 11, wherein the transmission delay is defined based on actual measurements of the forward-link and reverse-link delays between the base station and the test unit.

14. The test unit of claim 11, wherein the communication system conforms to an IS-95 standard.

15. The test unit of claim 14, wherein the communication system is a wireless-over-cable system or a fiber microcell system.

16. The test unit of claim 14, wherein the test unit is a CDMA radio test unit.

17. The test unit of claim 11, wherein:
a different transmission delay is defined for each different carrier frequency supported by the test unit;
each transmission delay is defined based on measurements of the forward-link and reverse-link delays;
if the transmission delay were set to zero and if the reverse-link signal arrives at the base station before the start of the base station search window, then communications between the test unit and the base station would not be possible;
the communication system conforms to an IS-95 standard; and
the test unit is a CDMA radio test unit.

18. The test unit of claim 17, wherein the communication system is a wireless-over-cable system or a fiber microcell system.

19. The test unit of claim 11, wherein, if the transmission delay were set to zero and if the reverse-link signal arrives at the base station before the start of the base station search window, then communications between the test unit and the base station would not be possible.

20. The test unit of claim 10, wherein:
the forward-link delay between the base station and a base station antenna is greater than the round-trip delay between the base station and the test unit; and
the magnitude of the specified non-zero transmission delay is based on a difference between the forward-link delay between the base station and the base station antenna and the round-trip delay between the base station and the test unit.

21. A method for transmitting a reverse-link signal from a test unit over a hard-wire connection to a base station of a communication system, the base station having a search window used to scan for the reverse-link signal, wherein the test unit delays transmission of the reverse-link signal by a specified non-zero transmission delay in order for the reverse-link signal to arrive at the base station within the base station search window, wherein a different transmission delay is defined for each different carrier frequency supported by the test unit.

22. A method for transmitting a reverse-link signal from a test unit over a hard-wire connection to a base station of a communication system, the base station having a search window used to scan for the reverse-link signal, wherein the test unit delays transmission of the reverse-link signal by a specified non-zero transmission delay in order for the reverse-link signal to arrive at the base station within the base station search window, wherein:
the communication system conforms to an IS-95 standard; and
the communication system is a wireless-over-cable system or a fiber microcell system.

23. A test unit for transmitting a reverse-link signal over a hard-wire connection to a base station of a communication system, the base station having a search window used to scan for the reverse-link signal, wherein the test unit is configured to delay transmission of the reverse-link signal by a specified non-zero transmission delay in order for the reverse-link signal to arrive at the base station within the base station search window, wherein a different transmission delay is defined for each different carrier frequency supported by the test unit.

24. A test unit for transmitting a reverse-link signal over a hard-wire connection to a base station of a communication system, the base station having a search window used to scan for the reverse-link signal, wherein the test unit is configured to delay transmission of the reverse-link signal by a specified non-zero transmission delay in order for the reverse-link signal to arrive at the base station within the base station search window, wherein:
the communication system conforms to an IS-95 standard; and
the communication system is a wireless-over-cable system or a fiber microcell system.

* * * * *